United States Patent
Päivinen et al.

(10) Patent No.: US 11,781,900 B2
(45) Date of Patent: Oct. 10, 2023

(54) VIBRATION DETECTION INSTRUMENT ASSEMBLY AND METHOD OF ASSEMBLING A VIBRATION DETECTION INSTRUMENT ASSEMBLY

(71) Applicant: Sulzer Management AG, Winterthur (CH)

(72) Inventors: Timo Päivinen, Taavetti (FI); Anssi Lehtonen, Inkeroinen (FI); Sami Virtanen, Kotka (FI); Juho Aalto, Kotka (FI)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 16/990,286

(22) Filed: Aug. 11, 2020

(65) Prior Publication Data
US 2021/0063237 A1    Mar. 4, 2021

(30) Foreign Application Priority Data
Aug. 27, 2019   (EP) .................................... 19193883

(51) Int. Cl.
*G01H 11/00*  (2006.01)
*G01P 15/00*  (2006.01)

(52) U.S. Cl.
CPC .............. *G01H 11/00* (2013.01); *G01P 15/00* (2013.01)

(58) Field of Classification Search
CPC ........ G01H 1/003; G01H 11/00; G01H 11/08; G01H 11/06; G01H 3/12; G01P 15/00;
(Continued)

(56) References Cited

U.S. PATENT DOCUMENTS 9,995,621 B2    6/2018  Clarke
2014/0117059 A1*  5/2014  Piety .................... B25B 15/008
                                                    224/191
(Continued)

FOREIGN PATENT DOCUMENTS

DE          19842173 A1 *  3/2000  .......... F16B 25/0078
EP           3236221 A1 * 10/2017  ............. G01H 11/00
(Continued)

OTHER PUBLICATIONS

Machine translation of EP 3236221 A! (Year: 2017).*
(Continued)

*Primary Examiner* — Alesa Allgood
*Assistant Examiner* — Sangkyung Lee
(74) *Attorney, Agent, or Firm* — GLOBAL IP COUNSELORS, LLP

(57) ABSTRACT

A vibration detection instrument assembly includes a vibration detection instrument and a deformable base part. The vibration detection instrument has a body part, including a support surface and an attachment screw extending from the support surface. The attachment screw enables the vibration detection instrument to be assemblable to a device to be monitored. The vibration detection instrument includes a vibration sensor to detect vibration at least in a direction deviating from a longitudinal axis of the attachment screw. The deformable base part is arranged at least partly against the support surface of the body part. The vibration detection instrument assembly includes a direction indicator arranged to indicate the direction of the vibration sensor.

8 Claims, 5 Drawing Sheets

(58) Field of Classification Search
CPC ... G01N 29/14; G01N 29/2437; H04R 17/025
See application file for complete search history.

(56) References Cited

U.S. PATENT DOCUMENTS

2017/0248451 A1\* 8/2017 Ginet ..................... G01D 11/30
2020/0061677 A1\* 2/2020 Nakano .................. H01L 41/09

FOREIGN PATENT DOCUMENTS

| FR | 2 528 235 A1 | 12/1983 | |
|---|---|---|---|
| KR | 101242820 B1 \* | 3/2013 | |
| WO | WO-2018116226 A1 \* | 6/2018 | ............. G01H 11/08 |
| WO | 2018/204663 A1 | 11/2018 | |
| WO | 2019/123610 A1 | 6/2019 | |

OTHER PUBLICATIONS

Machine translation of KR101242820 B1 (Year: 2013).\*
Machine translation of DE19842173A1 (Year: 2000).\*
Machine translation of FR2528235 (Year: 1983).\*
Extended European Search Report dated Feb. 27, 2020 in corresponding European Patent Application No. 19193883.6, filed Aug. 27, 2019.

\* cited by examiner

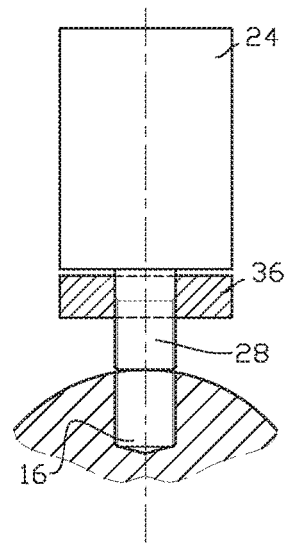
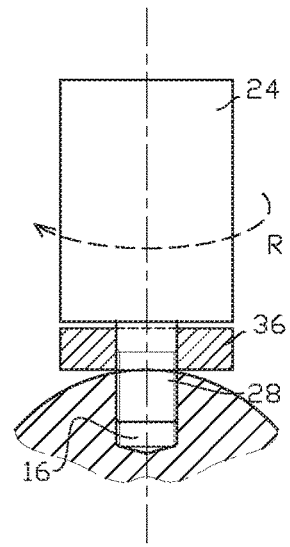
Fig. 3
Fig. 4
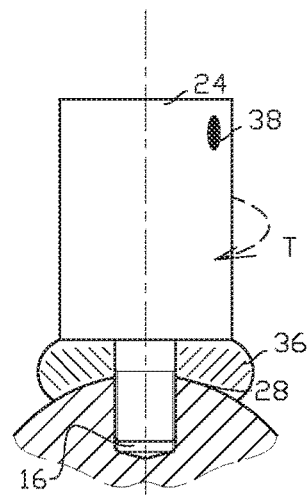
Fig. 5A
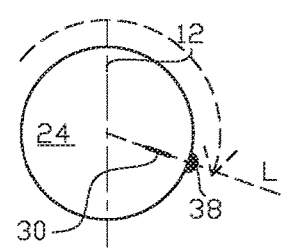
Fig. 5B
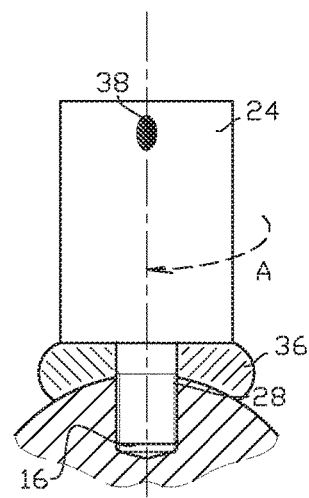
Fig. 6A
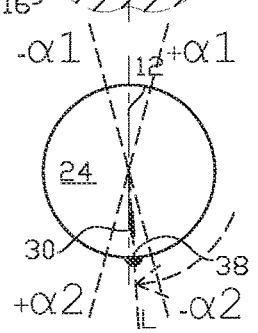
Fig. 6B

VIBRATION DETECTION INSTRUMENT ASSEMBLY AND METHOD OF ASSEMBLING A VIBRATION DETECTION INSTRUMENT ASSEMBLY

CROSS-REFERENCE TO RELATED APPLICATION

This application claims priority to European Patent Application No. 19193883.6, filed Aug. 27, 2019, the contents of which are hereby incorporated herein by reference in their entirety.

BACKGROUND

Field of the Invention

The present invention relates to the field of monitoring of operational parameters of mechanical devices or machines using a vibration detection instrument assembly comprising a vibration detection instrument having a body part, which includes a support surface and an attachment screw extending from the support surface in the direction of its normal, and at least one vibration sensor configured to detect vibration at least in a direction.

The present invention also relates to a method of assembling a vibration detection instrument assembly to a device to be detected.

BACKGROUND INFORMATION

The vibration of machines is commonly used as indication of a condition of the parts of such machine. Efficient detection of potential problem requires detection of vibration in various directions such as in the direction of a rotating shaft of the machine and in two directions perpendicular to the direction of a rotating shaft and to each other.

A detecting instrument needs to be fastened, usually removably, e.g. in a body part of the machine to be monitored rigidly enough to prevent the detecting instrument form vibrating itself.

Publication WO2018204663 is an example of attaching a detecting instrument to a device. Publication WO2018204663 discloses a sensor for detecting vibrations or other movements. The sensor includes an attachment piece or device, which may include a threaded protrusion or extension, which may cooperatively attach or screw onto a corresponding mount or piece attached to the external system.

SUMMARY

It has been found that a detecting instrument, particularly if it is of greater inertia and when for example it contains several sensors for detecting physical variables, tends to be somewhat bulky compared to a detecting instrument having only one sensor, and therefore attachment of such detecting instrument tends to be cumbersome if simultaneously simple attachment and easy removing is required for ease the maintenance.

An object of the invention is to provide a vibration detecting instrument assembly the attachment of which is considerably improved compared to the prior art solutions.

An object of the invention is to provide a method of assembling a vibration detecting instrument assembly which is considerably improved compared to the prior art solutions.

Objects of the invention can be met substantially as is disclosed herein.

In one embodiment of the present invention, a vibration detection instrument assembly comprises a vibration detection instrument having a body part, which includes a support surface and an attachment screw extending from the support surface in the direction of the normal of the surface, by which screw the vibration detection instrument is assembled to a device to be monitored by the vibration detection instrument assembly. The vibration detection instrument comprises at least one vibration sensor configured to detect vibration at least in a direction deviating from longitudinal axis of the attachment screw. The vibration detection instrument assembly further comprises a deformable base part arranged at least partly against the support surface of the body part.

By the deformable base part the vibration detection instrument can by assembled to the device such that rigidity of the attachment is high enough for accurate vibration measurement. This also makes it possible to attach the vibration detection instrument to the device without machining the counter surface in the device.

According to an embodiment of the invention the deformable base part is arranged around the attachment screw in a rotationally symmetrical manner, which makes the attachment rigid symmetrically in all directions.

According to an embodiment of the invention, plastic deformation is caused in the deformable base part when the vibration detection instrument is installed for use. The deformable base part makes it possible to attach the vibration detection instrument to the device without machining the counter surface in the device.

According to an embodiment of the invention, the body part of the vibration detection instrument includes a planar support surface at the first end of the body part, and that the base part is a base plate and the deformable base plate is arranged against the planar support surface.

According to an embodiment of the invention the body part includes a support surface having a periphery rim, wherein the deformable base part is arranged to extend inwards from the rim edge over the entire periphery of the support surface.

According to an embodiment of the invention, the vibration detection instrument assembly comprises a direction indicator which is arranged to indicate direction the vibration sensor configured to detect vibration at least in a direction deviating from the longitudinal axis of the screw.

According to an embodiment of the invention, the body part includes a visual direction indication sign.

According to an embodiment of the invention, the deformable base plate comprises an opening configured to receive the attachment screw so as to extend through the opening and that the deformable based plate is arranged stationary with respect to the screw.

According to an embodiment of the invention, the deformable base plate is fixed removably to the body part.

Another aspect of the present invention is a method of assembling a vibration detection instrument assembly according to anyone of the preceding claims to a device to be detected comprising fitting the attachment screw into a mating threaded hole in the device intended to be monitored, rotating the vibration detection instrument in a first rotational direction until the deformable base part meets the surface of the device, and tightening the vibration detection instrument into a predetermined moment in the first rotational direction, and rotating the vibration detection instrument further in the first rotational direction such that the sensor configured to detect vibration at least in a direction deviating from the longitudinal axis of the attachment screw is at a desired position.

According to an embodiment of the invention, the vibration detection instrument assembly is rotated further in the first rotational direction until is the direction indicator in the body indicates the direction of at least one of the sensors to be aligned a predetermined direction.

According to an embodiment of the invention, the vibration detection instrument assembly is tightened into a predetermined moment by rotating in the first rotational direction such that plastic deformation is caused in the deformable base part.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features which are considered as characteristic of the invention are set forth in particular in the appended claims.

BRIEF DESCRIPTION OF THE DRAWINGS

The invention will be explained in more detail hereinafter with reference to the drawings.

FIGS. 3 to 6B illustrates stages of installation of a vibration detection instrument according to an embodiment of the invention.

DETAILED DESCRIPTION OF THE EMBODIMENTS

Figure 1:
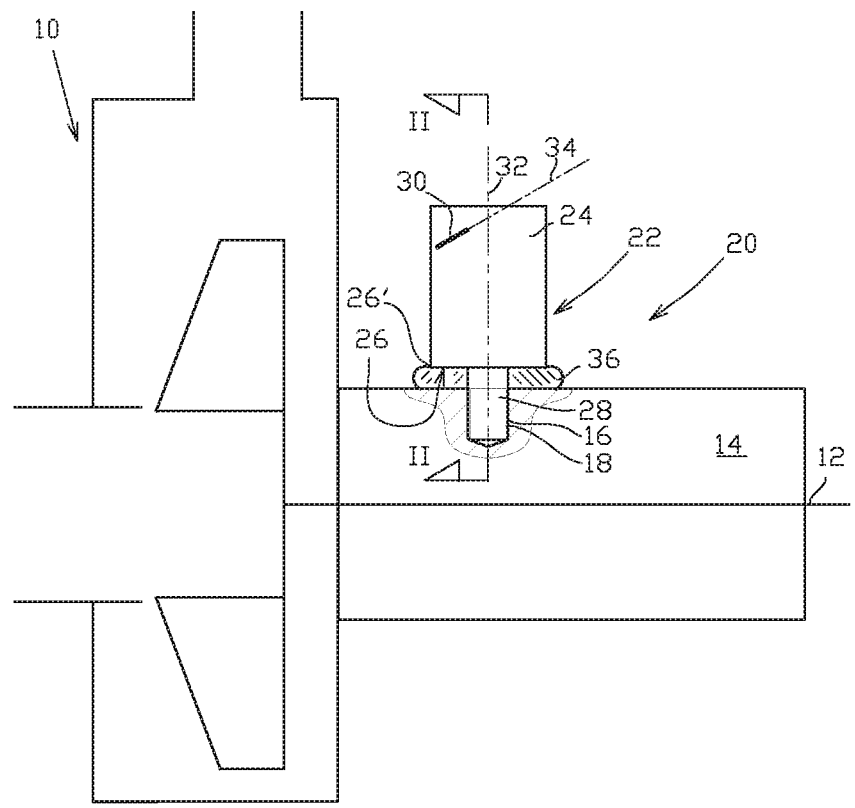
FIG. 1 illustrates a vibration detection instrument assembly a according to an embodiment of the invention.
Figure 2:
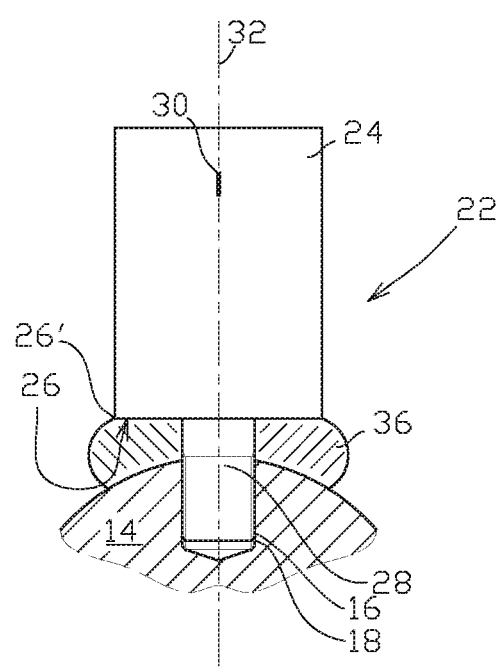
FIG. 2 illustrates a vibration detection instrument according to an embodiment of the invention.

FIG. 1 depicts schematically a device 10 which is prone to vibrations to such extent that vibration monitoring is practised when the device 10 is in use. In FIG. 1 the device is a centrifugal pump shown in an illustrative manner. Such a device may be for example a pump, an agitator or alike device. The device 10 comprises a rotatably supported shaft 12 arranged in a body 14 of the device 10. The shaft 12 is configured to be connected to a drive (not shown) for operating the device so that that the drive rotates the shaft 12 while the device 10 is in use. In order to efficiently monitor the operation of the device 10 it includes a vibration detection instrument assembly 20. The vibration detection instrument assembly 20 comprises a vibration detection instrument 22. FIG. 2 depicts a sectional view II-II of the vibration detection instrument 22. Referring to FIGS. 1 and 2, the vibration detection instrument 22 comprises in turn a body part 24. The body part 24 serves as an enclosure of components of the vibration detection instrument 22. The body part 24 includes a support surface 26. The vibration detection instrument 22 comprises an attachment screw 28 which is attached to the support surface 26, and is arranged to extend from the support surface 26 of the body part 24, by which screw the vibration detection instrument is assemblable to the device 10 intended to be monitored. The body 14 of the device 10 includes a blind hole 16 with an internal thread 18 to which the vibration detection instrument assembly 20 is removably attached when in use. The blind hole 16 can be drilled when the vibration detection instrument assembly 20 is assembled to the device 10 or the device body 14 can include a suitable pre-drilled blind hole 16 which can be used for attaching the vibration detection instrument assembly 20 to the body 14. In any case, the surface of the body 14 around the blind hole 16 is uneven, such as non-planar, or even slightly curved or circular, it is at least not machined or milled to improve the surface.

The attachment screw 28 is arranged to extend from the support surface 26 of the body part 24 in the direction of the normal of the support surface. When the support surface is substantially planar, as in the FIG. 1, the screw 28 is perpendicular to the support surface 26. The support surface 26 is arranged to provide mechanical support in the installation, and extend the surface contact area.

As is shown in the FIGS. 1 and 2, the vibration detection instrument 22 comprises at least one a vibration sensor 30 configured to detect vibration at least in a direction which deviates from the longitudinal axis of the attachment screw 28. Typically detecting vibration is based on the use of an accelerometer or an acceleration sensor. Acceleration is a vector quantity being involved to a specific direction and therefore a vibration sensor is configured to sense vibration in a specific direction which may be called here as the direction of the vibration sensor. Now, when assembled for use the vibration detection instrument 22 is aligned such that the sensor which is configured to detect vibration at least in a direction deviating from the longitudinal axis of the attachment screw and is aligned with a predetermined direction. In the FIG. 1, the direction in which the vibration sensor 30 is configured to detect vibration is depicted by direction line 34 and is shown by line 32. As it becomes clear from FIG. 1, the vibration sensor 30 is configured to detect vibration in a direction deviating from the longitudinal axis 32 of the attachment screw 28. The vibration detection instrument 22 is attached to the body 14 of the device 10 by fitting the attachment screw 28 into the mating threaded hole 16 in the device 10 and fixed thereto by rotating the vibration detection instrument 22 into a first rotational direction such that the screw advances into the hole when rotated. The shaft 12 of the device 10 has a longitudinal axis and when it is desired to detect vibration in the direction of the shaft's longitudinal axis, the vibration detection instrument 22 is rotated and positioned rotationally such that the direction 34 of the vibration sensor 30 forms a plane (which is the sectional plane in the FIG. 1) with the shaft's longitudinal axis. Advantageously the vibration sensor 30 is configured to detect vibration in a direction perpendicular to the longitudinal axis 32 of the attachment screw 28, the vibration detection instrument 22 is rotated and positioned rotationally such that the direction 34 of the vibration sensor 30 is substantially parallel to the shaft's longitudinal axis. A method of assembling the vibration detection instrument assembly 12 to the device 10 will be described later in more detailed manner.

FIG. 1 shows a situation where the vibration detection instrument 22 is installed to the device 10 to its operational position. The vibration detection instrument assembly 20 comprises a deformable base part 36 arranged at least partly against the support surface 26 of the body part 24 and when installed for use, plastic deformation is caused in the deformable base part and the base part is also against the surface of the device body 14. It should be noted that the deformable base part, being in a form of a base plate or a base ring, is exaggerated in the Figures.

In the embodiment of the FIG. 1 the deformable base part 36 is originally, i.e. prior to completing the installation, a planar base plate arranged around the attachment screw in a rotationally symmetrical manner. The deformable base plate 36 comprises an opening configured to receive the attachment screw 28 so as to extend through the opening and the deformable base plate is arranged stationary with respect to the body when the fitting of the base plate to the screw is suitably tight, preventing radial movement of the base plate in respect to the longitudinal axis of the screw. The deformable base plate may also be fixed removably to the screw or the body 24 of the vibration detection instrument 22.

More particularly, in FIGS. 1 and 2 the body part of the vibration detection instrument 22 includes a planar support surface 26 at the first end of the body part 24. The support surface 26 of the vibration detection instrument 22 is circular having a radius and the planar base plate is circular, such that the contact area of the base plate is rotationally symmetrical in respect to the longitudinal axis of the attachment screw. This, in this case means that radially outer radius of the planar base plate 36 is constant. Advantageously the radially outer radius of the planar base plate is equal to or greater than the radius of the support surface 26 of the vibration detection instrument 22.

The vibration detection instrument 22 has also a feature that the support surface 26 has a periphery rim 26', wherein the deformable base part 36 is arranged to extend inwards from the periphery rim edge, over, i.e. around the entire periphery of the support surface 26. This way the base part 36 is arranged to support and be located against the support surface 26 at its rim around the entire periphery of the support surface 26.

FIGS. 3 to 6B illustrate the method of assembling a vibration detection instrument assembly according to an embodiment of the invention. FIGS. 5A and 5B and 6A and 6B show a side view 5A and 6A and a top view 5B and 6B of the vibration detection instrument 22 because in these positions the rotational position of the vibration detection instrument 22 has certain significance. According to an advantageous embodiment of the invention the vibration detection instrument 22 comprises a direction indication means or device (indicator) 38 (shown in FIGS. 5A-6B) which is arranged to indicate the direction the vibration sensor i.e. the direction of vibration measurement of the sensor in respect to the longitudinal axis of the attachment screw 28. In the FIGS. 5A-6B the direction indicator in body part 24 is particularly a visual direction indication sign 38, such as a visually recognizable dot (e.g. by color or surface form) on the surface of the vibration detection sensor 22. The visual direction indication sign 38 is arranged on an outer surface of the body 24 of the vibration detection instrument such that direction of the measurement of the sensor 30 assembled in the vibration detection sensor 22 is parallel to a line L between the visual direction indication sign 38 and the longitudinal axis 32 of the attachment screw 28. The direction indicator 38 can be an indication realized by running a computer program in a computer (now shown) belonging to the assembly. For example, when the device is operated the measurement data can be analysed used for indicating proper direction of the measurement of the sensor 30 since signal obtained is usually strongest when the sensor direction is parallel to the direction of vibration of the device.

In the FIG. 3 there is shown an initial stage of the assembling where the attachment screw 28 is fitted into a mating threaded hole 16 in the device 10 intended to be monitored. This can be called as initial stage.

Next, as is shown in the FIG. 4, the vibration detection instrument 22 is rotated, as is shown by the arrow R, in a first rotational direction until the deformable base part 36 meets the surface of the body 14 of the device 10. This can be called as engagement stage.

Subsequently, as is shown in the FIGS. 5A and 5B, the vibration detection instrument 22 is tightened, as is illustrated by the arrow T, into a predetermined moment in the first rotational direction. This can be called as tightening stage.

And finally, according to FIGS. 6A and 6B, the vibration detection instrument 22 is rotated further in the first rotational direction, as is shown by the arrow A, such that the sensor 30 is at a desired position. This can be called as alignment stage. Now the vibration detection instrument is fitted to the device.

During practising, the alignment stage of the direction indicator 38 is utilized such that the vibration detection instrument 22 is rotated further in the first rotational direction until the direction indicator 38 in the body indicates the direction of at least one of the sensors to be aligned to a predetermined direction. The direction can be presented as angle in respect to the direction of interest. As is depicted in FIG. 6B, the alignment of the direction indicator 38 and the sensor should be understood so that it is not always necessary to reach absolute alignment with the desired detection direction. The direction of the shaft 12 of the device 10 is shown in the FIGS. 5B and 6B and the direction of the shaft is the direction of interest. As can be seen, in this case the tightening stage (FIGS. 5A and 5B) leaves the direction indicator 38 far from alignment with the shaft 12 and the vibration detection instrument 22 is rotated further in the alignment stage, at least such that axial vibration of the shaft can be monitored. In FIGS. 6A and 6B, it is depicted that in the alignment stage the vibration detection instrument 22 is further rotated such that the direction indication means 38 is within a preset alignment angle range from $-\alpha$ to $+\alpha$. It may be adequate in many practical applications that the range is $-10°$ to $+10°$ in respect to the direction of the direction of the shaft 16 (generally direction of interest). The vibration detection instrument 22 is always rotated in the same direction for tightening and aligning the screw. As it becomes clear from the FIGS. 6A and 6B the vibration detection instrument 22 is rotated in the alignment stage in maximum an angle which is $180°-\alpha1-\alpha2$. If $\alpha=10°$, the maximum needed rotation for alignment is $160°$. This applies because when the sensor 30 is between $-\alpha1$ to $+\alpha1$ after the tightening stage, the instrument 22 does not need the alignment stage. Should the position of the sensor 30 be outside the range $-\alpha1$ to $+\alpha1$ after the tightening stage, as is the case in the FIGS. 5A and 5B, the adjustment stage is needed and the sensor 30 needs to be rotated to be within the range $-\alpha2$ to $+\alpha2$. This is because a detection direction of a vibration sensor can be aligned with the desired direction at $0°$ or $180°$ positions with respect to the shaft axis 12.

Advantageously in the tightening stage plastic deformation is caused in the deformable base part 36. According to embodiments of the invention, the frequency range to be measured or detected by the vibration detection instruments is determined and the vibration detection instrument is assembled to device intended to be monitored such that the natural frequency of the vibration detection assembly is outside the frequency range to be measured. This provides improved contact for reliable vibration detection between the device body 14 and the support surface 26 due to the deformation of the base part 36, but still the coupling is rigid enough to provide accurate vibration measurement at the natural frequency range. Attachment solely using the screw 28 provides too low natural frequency for adequate vibration measurement. Material of the deformable base part can be for example metal, or rigid plastic, polymer or composite, advantageously monolithic structure. For example, in addition to copper, other ductile malleable metal or metal alloy, which has adequate ability to deform plastically, may be usable—such a zinc of bronze.

Selection of suitable material for the deformable base part may be done so that a candidate base part is set in place, and the attachment screw 28 is fitted into a mating hole, and rotated in a first rotational direction until the deformable base part candidate meets the surface of the body. Subsequently the vibration detection instrument is tightened until a desired natural frequency is reached. The natural frequency needs to be greater than the frequency to be monitored. If the natural frequency is too low the candidate base plate is rejected and another one, being more rigid, is tested. When high enough natural frequency is obtained there is a further requirement that the base part must endure rotation of the vibration detection instrument 22 over at least 160° without breaking the screw or the base part. This is also partly affected by coefficient of friction and surface quality between the materials.

Figure 7:
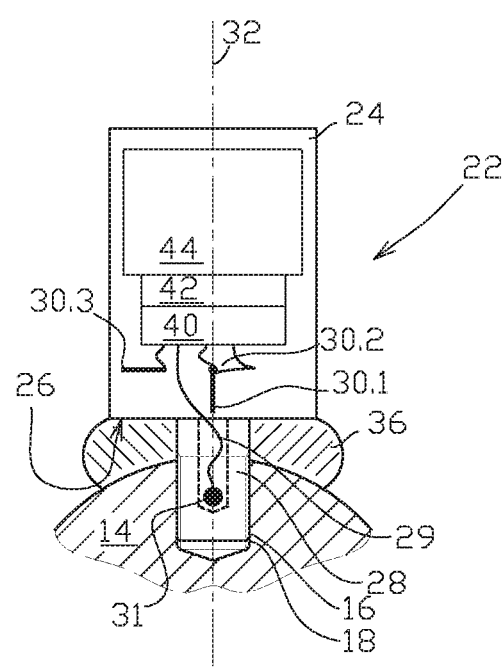
FIG. 7 illustrates a vibration detection instrument according to another embodiment of the invention.

FIG. 7 shows a vibration detection instrument 22 according to an embodiment of the invention. The vibration detection instrument 22 comprises a temperature sensor 31 which is arranged in the screw 28. The screw 28 includes a bore 29 extending parallel to, advantageously co-axially to a center axil of the screw 28 and the temperature sensor 31 is arranged in the bore 29 of the screw 28. This way the temperature sensor 31 is outside the body part 24 in the screw 28 and when the vibration detection instrument 22 is installed to the device the temperature sensor 29 is located at region inside the device 10 and thus indicates the temperature of the body 14 of the device 10 more accurately. Even if not shown the vibration detection instrument 22 shown in the FIGS. 1 and 8 can also include a temperature sensor 29 embedded to the screw 28. Particularly when the vibration detection instrument 22 comprises the temperature sensor 31 inside the screw 28, the deformable base part brings about additional effects. Namely, when tightening the screw 28 to the base 14 deformation of the base part decrease stress caused to the screw 28 and its risk of breaking.

The vibration detection instrument 22 of FIG. 7 comprises three vibration sensors 30.1, 30.2, 30.3 configured to detect vibration in three directions substantially perpendicular to each other. The first sensor 30.1 is configured to detect vibration in the direction of the longitudinal axis of the attachment screw 28, and the second sensor 30.2 and the third sensor 30.3 are configured to detect vibration in the direction perpendicular to the first sensor 30.1 and to each other. The vibration detection instrument 22 comprises also a data processor 40 coupled with the sensors, a wireless data transmission device 42 and a battery 44. By the invention the vibration detection instrument 22 equipped with the at least these elements, particularly the battery 44 increasing the mass of the body part 24 considerably, can still be efficiently used for monitoring the operation of the device 10 thanks to the stiff coupling according to the invention by means of which the natural frequency of the vibration detection instrument 22 can be set high enough even if the attachment is accomplished through one screw joint only.

Figure 8:
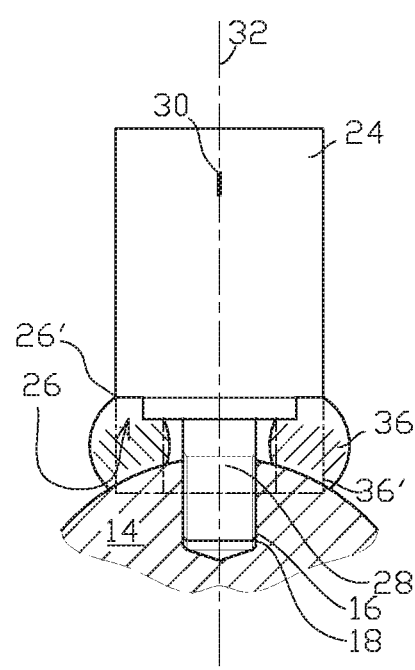
FIG. 8 illustrates a vibration detection instrument according to still another embodiment of the invention.

FIG. 8 shows another embodiment of a vibration detection instrument 22 according to the invention. Here the vibration detection instrument 22 has also a feature that the support surface 26 has an axial step-like cutout over its periphery rim 26', wherein the deformable base part 36 is originally a sleeve 36' arranged to extend inwards from the periphery rim edge, over, i.e. around the whole periphery of the support surface 26. The sleeve 36' is radially and axially positioned and attached to the cutout portion, such that movement, slipping, of the deformable base part 36 radially inwards from the rim 26' is prevented. The deformable base part 36 is thus arranged to extend inwards from the rim edge over the whole periphery of the support surface. In the embodiment shown in the FIGS. 1-7 the base part is positioned in place by substantially tight fitting with the screw 29.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

What is claimed:

1. A vibration detection instrument assembly, for monitoring vibration of a device, comprising:
   a vibration detection instrument having a body part, which includes a support surface and an attachment screw fixed to the support surface and extending from the support surface in a direction normal to the support surface, the attachment screw configured to enable the vibration detection instrument to be assembled and tightened by rotation of the vibration detection instrument directly to the device to be monitored, the vibration detection instrument comprising a vibration sensor configured to detect vibration at least in a direction deviating from a longitudinal axis of the attachment screw; and
   a plastically deformable base part arranged at least partly against the support surface of the body part, so as to enable tightening of the vibration detection instrument into a predetermined moment to reach a predetermined natural frequency by rotation of the vibration detection instrument in a first direction after the deformable base part meets a surface of the device and further in the first rotational direction, such that the sensor is at a predetermined position, and
   the vibration detection instrument assembly comprising a direction indicator arranged to indicate the direction of the vibration sensor configured to detect the vibration at least in the direction deviating from the longitudinal axis of the screw.

2. The vibration detection instrument assembly according to claim 1, wherein the deformable base part is arranged around the attachment screw in a rotationally symmetrical manner.

3. The vibration detection instrument assembly according to claim 1, wherein with the support surface is planar and is disposed at a first end of the body part, and the base deformable part is a plate arranged against the planar support surface.

4. The vibration detection instrument assembly according to claim 1, wherein the support surface has a periphery rim, and the deformable base part is arranged to extend in-wards from an edge of the periphery rim over an entire periphery of the support surface.

5. The vibration detection instrument assembly according to claim 1, wherein the direction indicator is a visual direction indication sign disposed on the body part.

6. The vibration detection instrument assembly according to claim 1, wherein the de-formable base part comprises an opening configured to receive the attachment screw, such that the attachment screw is capable of extending through the opening, so that the deformable based plate is arranged stationary with respect to the screw.

7. The vibration detection instrument assembly according to claim 1, wherein the deformable base part is removably fixed to the body part.

8. A method of assembling the vibration detection instrument assembly according to claim 1 to a device to be detected, the method comprising:
fitting the attachment screw directly into a mating threaded hole in the device to be monitored;
rotating the vibration detection instrument in a first rotational direction such that the screw advances into the hole when rotated, until the deformable base part meets a surface of the device;
tightening the vibration detection instrument into a predetermined moment by rotation of vibration detection instrument further in the first rotational direction such that plastic deformation is caused in the deformable base part and a predetermined natural frequency is reach; and
rotating the vibration detection instrument still further in the first rotational direction such that the sensor configured to detect the vibration at least in the direction deviating from the longitudinal axis of the attachment screw is at a predetermined position, the vibration detection instrument assembly being rotated further in the first rotational direction until the direction indicator in the body indicates the direction of at least one of the sensors to be aligned in a predetermined direction.

* * * * *